(12) United States Patent
Whittaker

(10) Patent No.: US 9,133,740 B1
(45) Date of Patent: Sep. 15, 2015

(54) AUXILIARY OIL GAUGE ASSEMBLY

(71) Applicant: Loran L. Whittaker, Rootstown, OH (US)

(72) Inventor: Loran L. Whittaker, Rootstown, OH (US)

( * ) Notice: Subject to any disclaimer, the term of this patent is extended or adjusted under 35 U.S.C. 154(b) by 239 days.

(21) Appl. No.: 13/770,428

(22) Filed: Feb. 19, 2013

Related U.S. Application Data

(60) Provisional application No. 61/736,062, filed on Dec. 12, 2012.

(51) Int. Cl.
*G01L 7/00* (2006.01)
*B60Q 1/00* (2006.01)
*F01M 11/10* (2006.01)

(52) U.S. Cl.
CPC ..................................... *F01M 11/10* (2013.01)

(58) Field of Classification Search
None
See application file for complete search history.

(56) References Cited

U.S. PATENT DOCUMENTS

| | | | |
|---|---|---|---|
| 2,286,717 A * | 6/1942 | Clason | 338/42 |
| 3,869,905 A * | 3/1975 | Allen | 73/114.57 |
| 3,943,760 A * | 3/1976 | Allen | 73/114.57 |
| 4,613,824 A * | 9/1986 | Rinderle | 330/302 |
| 6,060,985 A * | 5/2000 | Siviero | 340/461 |
| 6,636,155 B2 * | 10/2003 | Elizondo-Salinas | 340/815.4 |
| 7,415,887 B2 * | 8/2008 | Shpakow | 73/756 |
| 7,509,848 B2 * | 3/2009 | Chen | 73/146 |
| 7,740,100 B2 * | 6/2010 | Takahashi et al. | 180/311 |
| 2013/0255372 A1 * | 10/2013 | Sasaki et al. | 73/290 R |

OTHER PUBLICATIONS

Custom Chrome 2012 Catalog, Sheetmetal & Gauges, 10.69-10.70, 2 Pages.
Mid-USA Motorcycle Parts 2012 Catalog, St. Louis, MO, Fuel Section, 8-51-8-52, 2 Pages.

* cited by examiner

*Primary Examiner* — Peter Macchiarolo
*Assistant Examiner* — Jermaine Jenkins
(74) *Attorney, Agent, or Firm* — Sand & Sebolt

(57) ABSTRACT

The invention relates to an auxiliary oil gauge assembly having a body connected to a mechanical oil gauge and to the stock sending unit. The body is configured to allow oil to flow to the mechanical gauge as well as the stock sending unit to facilitate providing both mechanical and electrical oil pressure feedback to the observer. Further, the auxiliary oil gauge assembly is configured to safely mount to the engine block without penetrating the user's leg space. The fastener assembly for mounting the body to the engine is independently rotatable with respect to the body, thus allowing the user to orient the gauge independently of securing the body to the engine.

20 Claims, 5 Drawing Sheets

AUXILIARY OIL GAUGE ASSEMBLY

CROSS-REFERENCE TO RELATED APPLICATION

This application claims priority from U.S. Provisional Application Ser. No. 61/736,062, filed Dec. 12, 2012, the disclosure of which is incorporated herein by reference.

BACKGROUND OF THE INVENTION

1. Technical Field

This invention relates to an auxiliary oil gauge for a motorcycle. More particularly, this invention relates to an auxiliary oil gauge which is configured to mount to the engine block. Specifically, this invention relates to an assembly having a body connected to a mechanical oil gauge, whereby the body allows engine oil to flow to the mechanical gauge as well as to the stock oil sending unit to facilitate providing both mechanical and electrical oil pressure feedback to the observer.

2. Background Information

Heretofore, there have existed motorcycles which include a standard off the shelf oil pressure monitoring system. These may include an electrical oil gauge which electronically connects to an oil pressure monitor proximate the engine. In the event of a failure within the standard oil pressure monitoring system, the gauge may cease operation unbeknownst to the user. This may occur by way of a light bulb burning out or a wire disconnecting from the various components of the oil pressure monitoring system. Typically, these standard factory oil pressure monitoring systems incorporate a light bulb, which discussed previously, may burn out. In the event of a light bulb burn out, the user has no way of knowing that the oil monitoring system is not providing accurate results. The user simply sees the oil gauge and the absence of a lighted warning and believes the oil pressure system and the oil pressure in general within the engine is at the proper range. In the event of such an indicator failure, improper oil pressure within the engine may cause catastrophic damage to the overall engine itself. This results in a very high cost to the motorcycle owner to replace or repair the engine.

Several manufacturers have attempted to design an auxiliary oil gauge for a motorcycle but these devices have been met with very limited commercial success. All of these prior designs suffer from design issues making them commercially undesirable. Some of these devices use an integrated monolithic adapter unit that includes a threaded recess for receiving the gauge as well as a threaded male portion for screwing into the engine. One will readily realize that when the adapter is turned to properly secure it to the engine, the gauge will necessarily rotate as well. This prevents the operator from obtaining both a proper fit between the engine and the adapter and a proper orientation of the gauge. One of the two requirements cannot be met in prior art devices. However, both requirements are of great importance. A proper fit and seal with the engine must be made to ensure proper oil readings and adequate pressure throughout the system. Similarly, the gauge must be positioned to present the information to the user while simultaneously be positioned to not disrupting the user's foot or leg and to maintain safety. Inasmuch as the prior art devices cannot be tightened without also turning the gauge, these devices are generally not commercially viable.

Other prior art devices provide an adapter unit to connect with the engine and provide an aperture for connecting a hose or remote line for receiving oil pressure therein. The hose extends to a bracket or other mounting hardware that is intended to be mounted to the rocker box of the motorcycle and receive the gauge thereon. However, this hose is exposed proximate the user's feet and legs and may be blown about while riding on the motorcycle, which represents a safety issue for the rider.

Thus, a need exists in the art to provide an auxiliary oil gauge assembly which may provide a secondary source of oil pressure readings to the user. This auxiliary oil gauge assembly must be free from additional hoses and mount in such a way that the operator's leg will not abut the auxiliary oil gauge. Additionally, the gauge itself must pivot or rotate independently from the fastening assembly for securing the gauge or body to the engine. This will allow the user to secure the device to the engine while independently rotating and positioning the gauge at the proper orientation. Further, this auxiliary oil gauge assembly may incorporate the factory oil pressure monitoring system so as to be an add-on aftermarket component and may easily and conveniently install without the need to remove the standard factory oil pressure monitoring system from the motorcycle.

BRIEF SUMMARY OF THE INVENTION

The present invention provides an auxiliary oil gauge assembly to a motorcycle, whereby the user may observe the auxiliary oil gauge to determine oil pressure in the motorcycle engine. This is in addition to the standard off-the-shelf oil pressure monitor system provided on common motorcycles. In the event of a system failure regarding the standard oil pressure monitor system, the auxiliary oil gauge assembly will maintain an oil pressure reading for the user.

The present invention also allows the gauge itself to pivot or rotate independently from the fastening assembly used for securing the gauge or body to the engine. This allows the user to secure the device to the engine while independently rotating and positioning the gauge at the proper orientation.

The present invention relates to an assembly generally comprising a pipe body adapted to connect to a motorcycle engine and to receive engine oil therethrough; an oil gauge connected to the pipe body and adapted to display the oil pressure of the motorcycle engine; and an exit aperture defined by the pipe body, whereby engine oil flows into the pipe body from the motorcycle engine and out of the exit aperture.

The present invention also relates to an assembly generally comprising a pipe body defining a fastener channel; an oil gauge connected to the pipe body; a pipe plug defining a longitudinal channel therethrough; a banjo bolt extending into the fastener channel and longitudinal channel; whereby the pipe plug is adapted to rotatably secure the pipe body to a motorcycle engine to receive engine oil into the longitudinal channel; and whereby the pipe plug rotates independently of the pipe body.

The present invention also relates to a method of monitoring oil pressure generally comprising the steps of disconnecting an oil pressure sending unit from a motorcycle engine; securing a pipe body to the motorcycle engine via a fastener assembly; connecting the oil pressure sending unit to the pipe body; securing an oil gauge to the pipe body; adjusting the orientation of the oil gauge position by rotating the pipe body independently of the fastener assembly; and rotating the fastener assembly independently of the pipe body.

BRIEF DESCRIPTION OF THE SEVERAL VIEWS OF THE DRAWINGS

Preferred embodiments of the invention, illustrated of the best mode in which Applicant contemplates applying the principles, are set forth in the following description and are shown in the drawings and are particularly and distinctly pointed out and set forth in the appended claims.

Similar numbers refer to similar parts throughout the drawings.

DETAILED DESCRIPTION OF THE INVENTION

Figure 1:
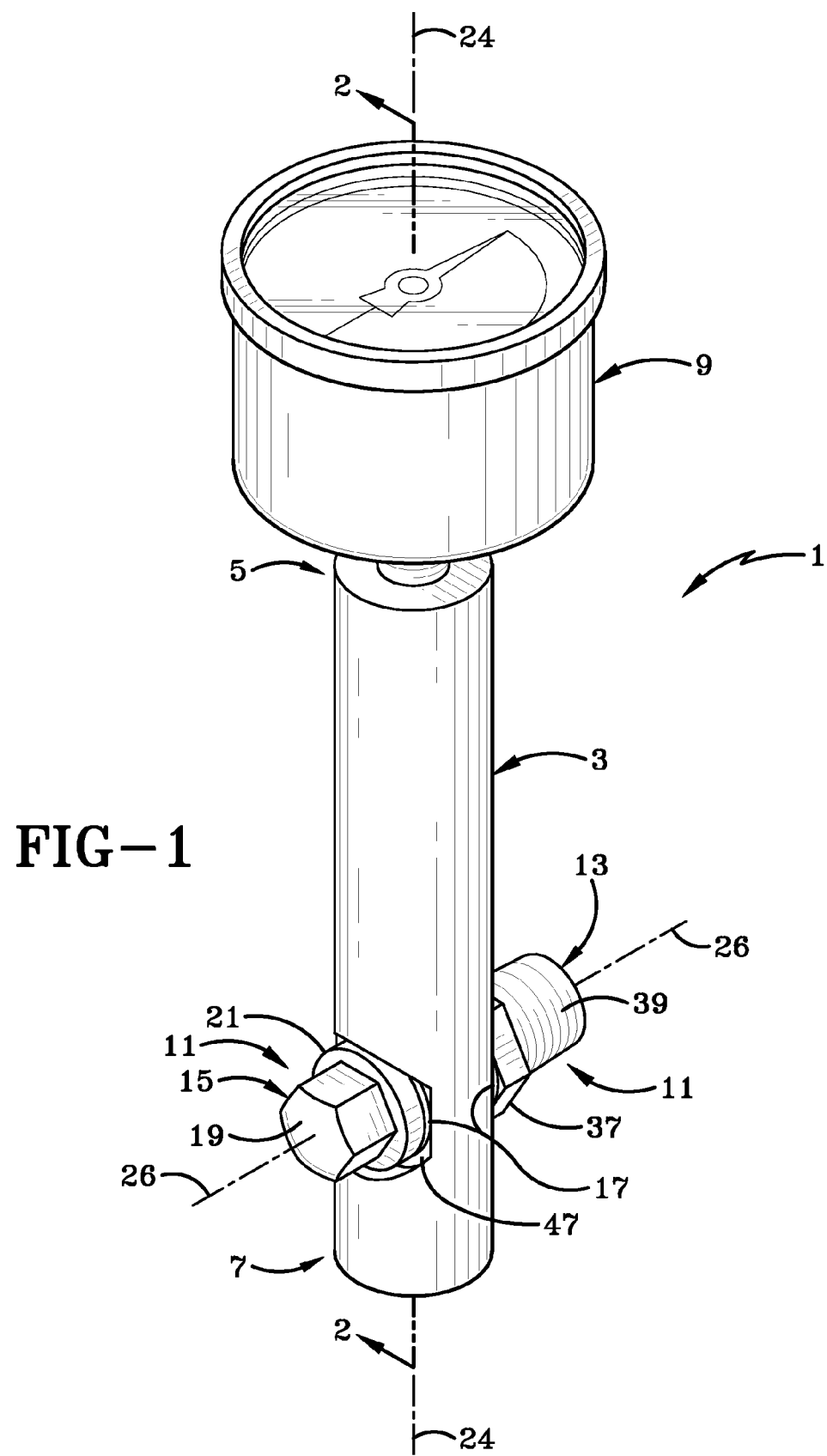
FIG. 1 is a perspective view of a first embodiment of an assembled auxiliary oil gauge assembly of the present invention.
Figure 2:
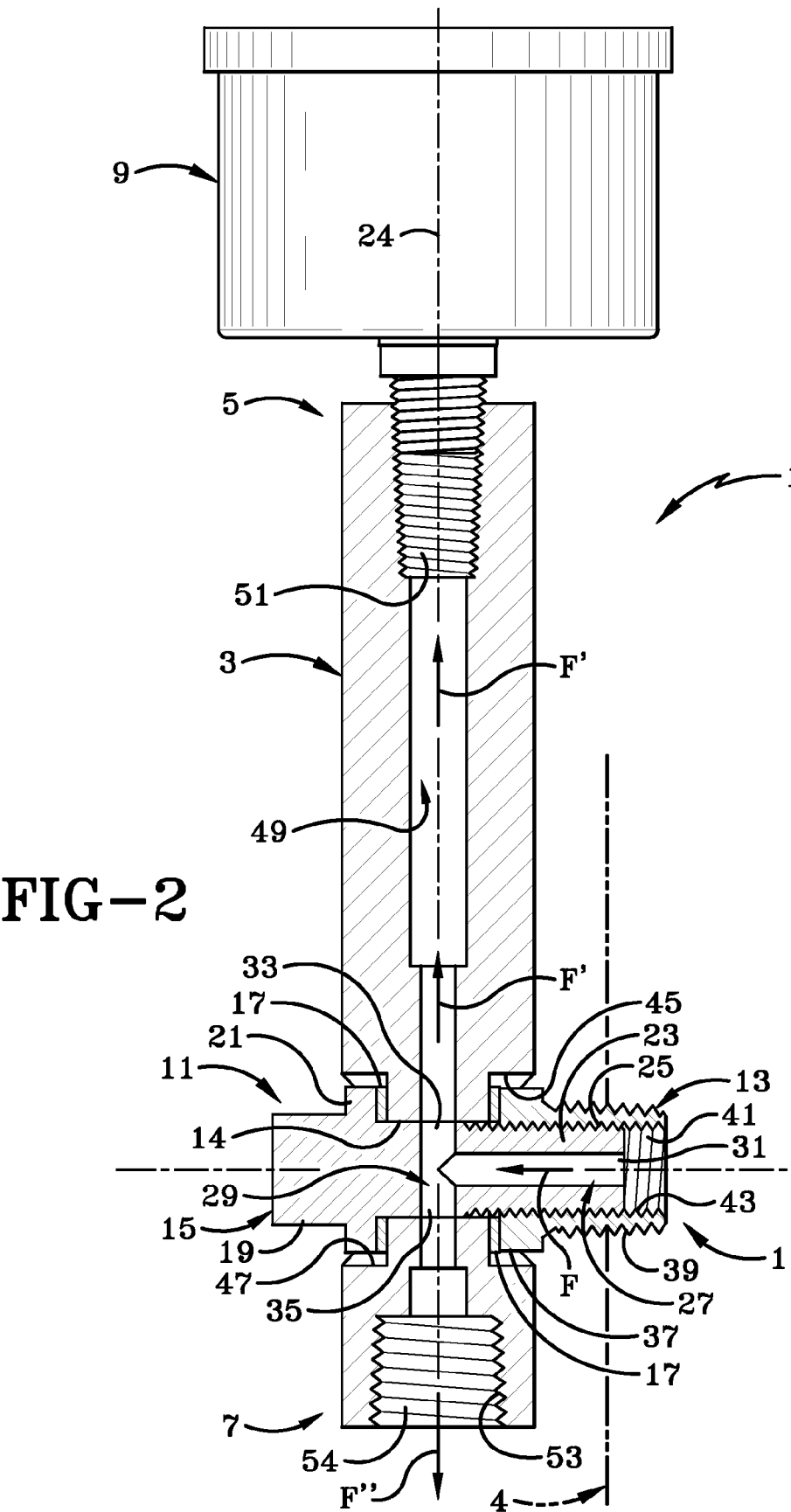
FIG. 2 is a cross-sectional view of the first embodiment of the oil gauge assembly, including the pipe body, the banjo bolt, and the oil gauge.
Figure 3:
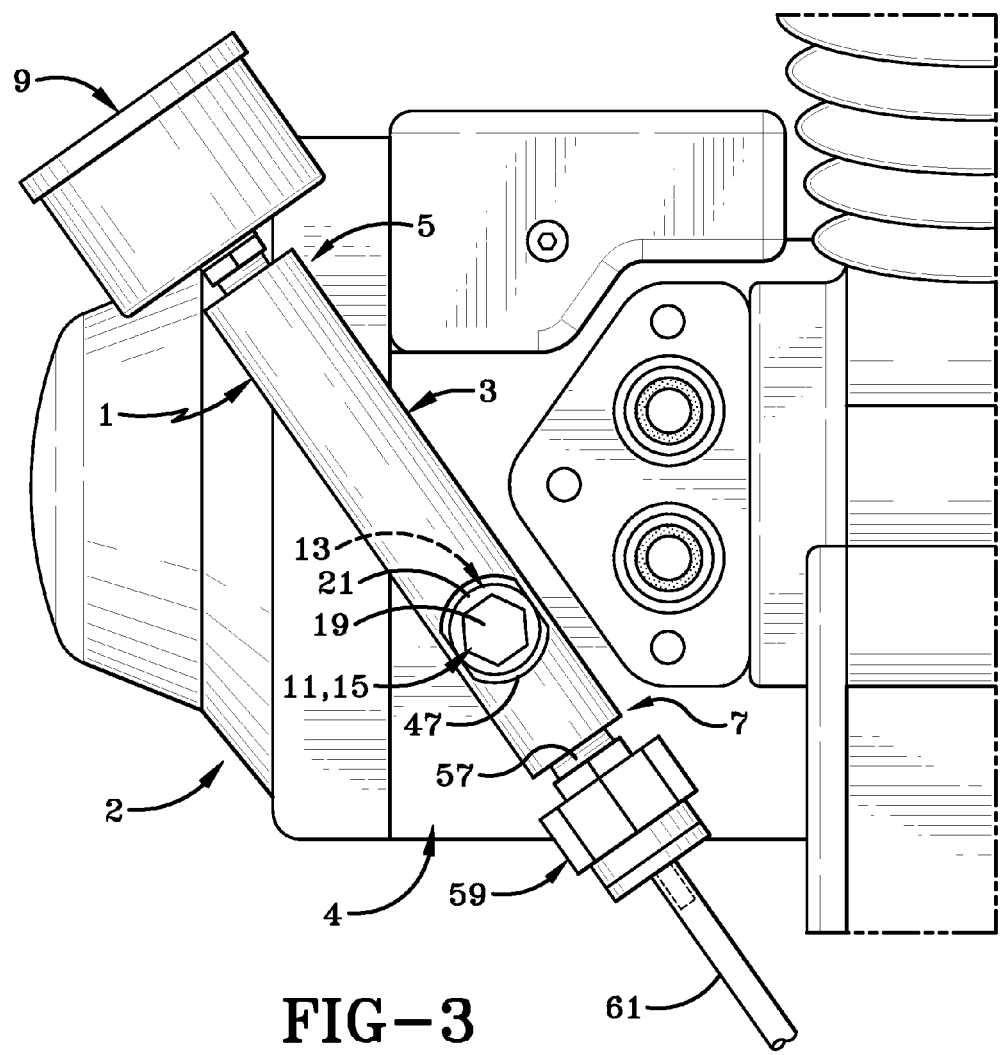
FIG. 3 is a perspective view of the first embodiment of the oil gauge assembly mounted on a motorcycle engine block.
Figure 4:
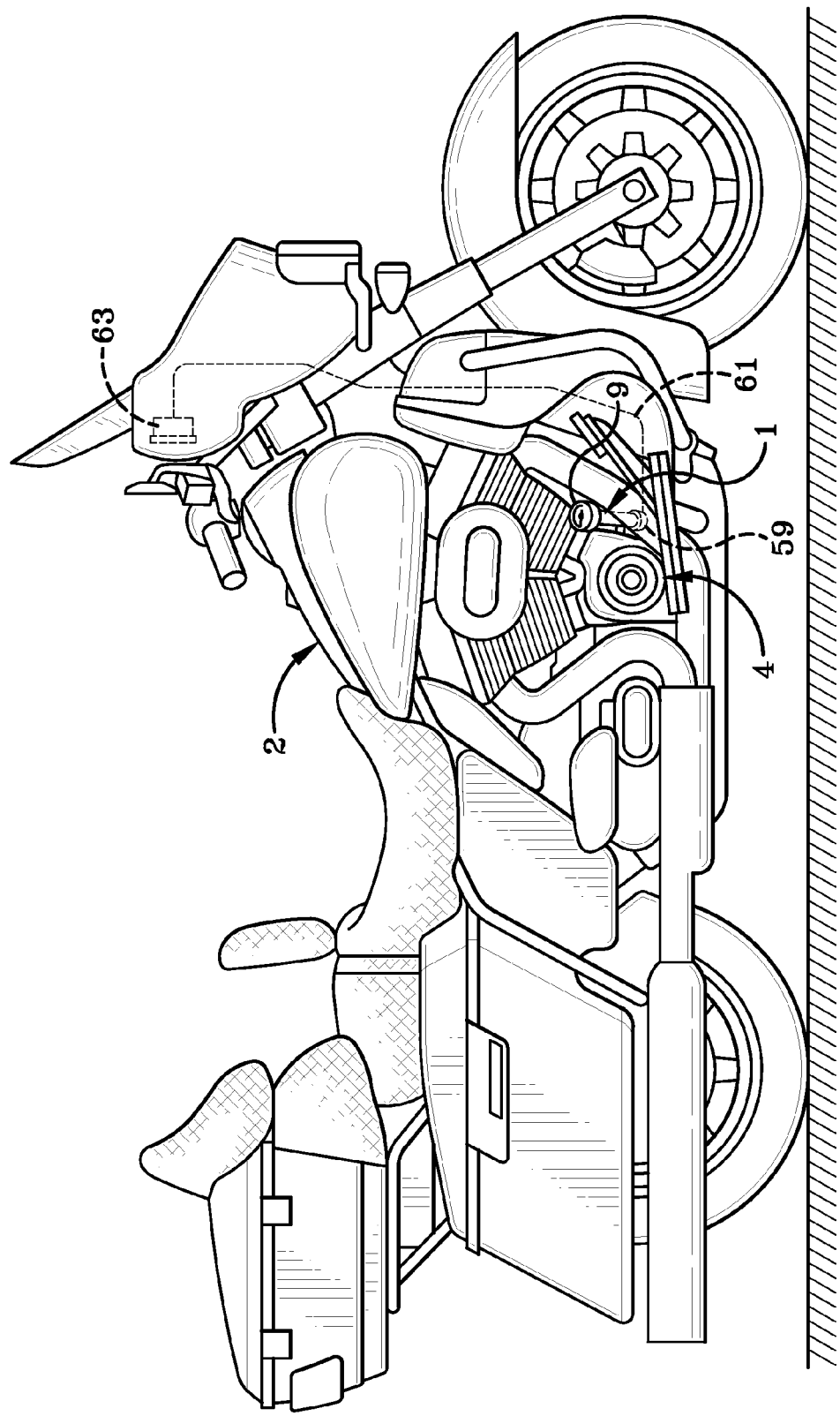
FIG. 4 is a perspective view of the first embodiment of the oil gauge assembly mounted on a motorcycle.

The auxiliary oil gauge of the present invention is shown in FIGS. 1-4 and indicated generally at 1. As shown in FIG. 1, auxiliary oil gauge assembly 1 includes a generally cylindrical elongated aluminum shaped pipe body 3 which includes a first end 5 and a spaced apart second end 7. In its fully assembled state, auxiliary oil gauge assembly 1 further includes an oil gauge 9 disposed generally proximate first end 5 and a fastener assembly 11 disposed proximate second end 7. Fastener assembly 11 of the present invention may be comprised of a pipe plug 13 connected to a banjo bolt 15 through a fastener channel 14 (FIG. 2) defined by pipe body 3. Fastener assembly 11 may optionally include at least a washer 17 for mating with one or both of pipe plug 14 and banjo bolt 15 to more securely hold fastener assembly 11 to pipe body 3. As shown in FIG. 4, fastener assembly 11 is configured to connect pipe body with an engine 4 of a motorcycle 2. Fastener assembly 11 aligns banjo bolt 15 through fastener channel 14 (FIG. 2), with or without washers 17, and connects to pipe plug 13 to secure banjo bolt 15, optional washers 17, and pipe plug 13 together about pipe body 3. One will readily recognize that fastener assembly 11 allows a user to secure pipe body 3 to engine 4 independently of the orientation of gauge 9. This allows a user to ensure a tight fit between auxiliary oil gauge assembly 1 and engine 4, while simultaneously allowing the user to rotate gauge 9 independently from fastener assembly 11.

As shown in FIGS. 1 and 2, banjo bolt 15 includes a nut end 19 with an integrated washer 21 and a shaft 23 extending therefrom. Disposed on at least a portion of shaft 23 is a threaded portion 25 for threadably engaging with pipe plug 13. Banjo bolt 15 further includes a longitudinal channel 27 defined by shaft 23 and extending along the longitudinal plane of banjo bolt 15 to approximately washer 21. Further, banjo bolt 15 includes a latitudinal channel 29 disposed intermediate threaded portion 25 and washer 21 and aligned generally latitudinally or perpendicularly with the longitudinal plane of banjo bolt 15. Longitudinal channel 27 and latitudinal channel 29 form a union proximate washer 21 whereby latitudinal channel 29 is oriented generally perpendicularly to longitudinal channel 27. Longitudinal channel 27 includes an aperture 31 spaced proximate threaded portion 25 while latitudinal channel 29 includes an aperture 33 and an aperture 35.

As shown in FIG. 2, pipe plug 13 includes a washer 37 and a threaded portion 39 and further includes a longitudinal channel 41 extending the entire length of pipe plug 13. A threaded surface 43 is disposed within a portion of longitudinal channel 41 and configured to threadably mate with threaded portion 25 of shaft 23 of banjo bolt 15 therein. Washer 37 of pipe plug 13 is sized to be received within a first recess 45 along the length of pipe body 3. Similarly, washer 21 of banjo bolt 15 is sized to be received in a second recess 47 disposed on pipe body 3. In the preferred embodiment of the present invention, washers 17 are similarly sized to be received between pipe body and the respective washer 37 and washer 21 to form a secure and tight abutment between banjo bolt 15, pipe plug 13, and pipe body 3.

As shown in FIG. 2, banjo bolt 15, and in particular shaft 23, is sized to extend through fastener channel 14 whereby threaded portion 25 of shaft 23 extends outwardly away from pipe body 3 and fastener channel 14. Thereafter, pipe plug 13 is threadably engaged with threaded portion 25 of shaft 23 by way of rotating pipe plug 13 to threadably engage threaded portion 25 with threaded surface 43.

Pipe body 3 includes an interior channel 49 extending entirely along the length of pipe body 3. First threaded portion 51 is disposed proximate first end and includes a generally greater cross-sectional width with respect to interior channel 49. Similarly, an enlarged second threaded portion 53 is disposed proximate second end 7 and also represents a greater cross-sectional width with respect to interior channel 49. An exit aperture 54 is defined by second end 7 and threaded portion 53.

When banjo bolt 15 is secured within fastener channel 14, longitudinal channel 27 is generally coplanar with interior channel 49, though longitudinal channel 27 and interior channel 49 are not necessarily coaxial. One with knowledge of banjo bolts in general would readily recognize that when banjo bolt 15 is disposed in fastener channel 14, longitudinal channel 27, latitudinal channel 29, and interior channel 49 are in fluid communication with one another. This represents the general method for splitting fluid flow which is received within latitudinal channel 29 from the exterior of auxiliary oil gauge assembly 1. As shown in FIG. 2, oil flow may enter pipe plug 13 and banjo bolt 15 by way of longitudinal channel 27 in the direction of Arrow F. As such, oil is directed through interior channel 49 and in two separate directions, namely, toward first end 5 in the direction of Arrow F' and also toward second end 7 in the direction of Arrow F".

Pipe plug 13 in general, and threaded portion 39 in particular, is configured to mount directly to engine 4 of motorcycle 2. As shown in FIG. 3, second end 7 of pipe body 3 abuts engine 4 by way of pipe plug 13 and threaded portion 39 thereof. Threaded portion 39 is received within a threaded interior chamber (not shown) which is configured to receive one end of a stock oil sending unit for a factory oil gauge having an electric bulb indicator on the distal end. After second end 7 is mounted to engine 4, auxiliary oil gauge assembly 1 is in fluid communication with the overall oil within engine 4. Thereafter, oil enters pipe plug 13 and aperture 31 of banjo bolt 15 and is dispersed through pipe body 3 by way of interior channel 49.

As shown in FIGS. 3 and 4, when pipe body 3 is oriented in such a way to have second end 7 mounted to engine 4, oil gauge 9 extends outwardly away from engine 4 to orient oil gauge 9 upwardly toward a rider of motorcycle 2. Oil gauge 9 provides a visual indicator of the oil pressure within engine 4 and may be of any type of indicator. However, oil gauge 9 is preferably a mechanical style gauge, which operates without the need for an electrical component such as a light bulb. Inasmuch as a threaded end 57 of a stock sending unit 59 must be removed from engine 4 before auxiliary oil gauge assembly 1 can be mounted thereto, threaded end 57 is thereafter threadably engaged with second end 7 of pipe body 3. As shown in FIG. 3, second threaded portion 53 of pipe body 3 receives threaded end 57 of stock sending unit 59 therein. As such, oil flowing through pipe body 3 enters stock sending unit 59 through threaded end 57. This allows stock sending unit 59 to remain functional by supplying oil therethrough. Thus, stock sending unit 59 and the indicator on motorcycle 2 remain fully functional after installing auxiliary oil gauge assembly 1 on motorcycle 2.

As shown in FIG. 4, one skilled in the art would readily recognize that when an auxiliary oil gauge assembly 1 is installed on motorcycle 2, motorcycle 2 enjoys two separate oil pressure indicators, auxiliary oil gauge assembly 1 and an original gauge 63 connected to stock sending unit 59 via a wire 61. Thus, if a bulb or an electric wire or some other electrical component within stock sending unit 59 breaks or burns out, the user will still be able to monitor oil pressure within engine 4 by way of oil gauge 9. Further, auxiliary oil gauge assembly 1, and in particular pipe body 3, is configured to mount directly on engine block 2 in a position where the operator's leg cannot disturb auxiliary oil gauge assembly 1. Thus, auxiliary oil gauge assembly 1 is configured to maintain overall safety of motorcycle 2 by displaying oil gauge 9 in a safe manner and out of the way of the operator's legs.

As shown in FIG. 2, an imaginary longitudinal central axis 26 is provided for reference extending through the longitudinal center of banjo bolt 15. Similarly, an imaginary longitudinal central axis 24 is provided for reference extending through the longitudinal center of pipe body 3. One will readily recognize the benefits of having axis 24 not coplaner with axis 26. It follows that pipe body 3 is independently manually rotatable about axis 26 of banjo bolt 15. Further, banjo bolt 15 is independently manually rotatable about axis 26 as well. Thus, banjo bolt 15 and pipe plug 13 may be rotated independently from pipe body 3 to secure auxiliary oil gauge assembly 1 to engine 4, leaving pipe body 3 in the proper orientation to display oil pressure readings to the user. Enabling both pipe body 3 and banjo bolt 15 to independently rotate about the same axis 26 represents an improvement over the prior art, where rotating the fastener mechanism of the integrated prior art devices also rotates the gauge away from proper orientation. Auxiliary oil gauge assembly 1 allows the user to secure pipe body 3 to engine 4 while maintaining the orientation of pipe body 3 with respect to engine 4. Conversely, the user can manually adjust and rotate gauge 9 about axis 26 to a different orientation without disrupting the secure connection of banjo bolt 15 and pipe plug 13 with engine 4. Thus, it is a primary feature of the present invention that banjo bolt 15 and pipe plug 13 may be rotated independent from pipe body 3.

Figure 5:
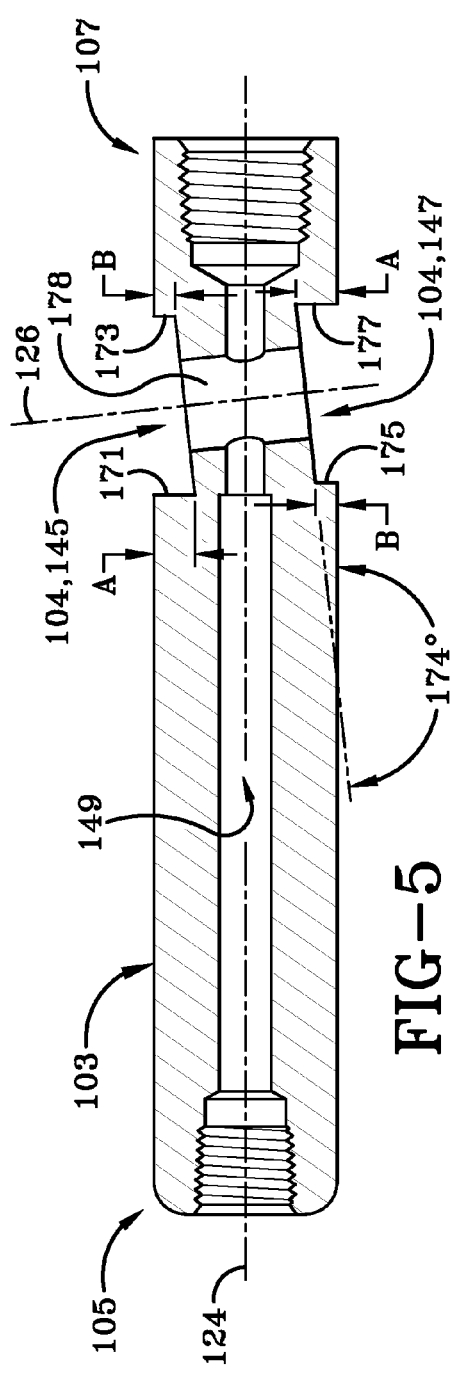
FIG. 5 is a cross-sectional view of a second embodiment of the pipe body of the present invention.
Figure 6:
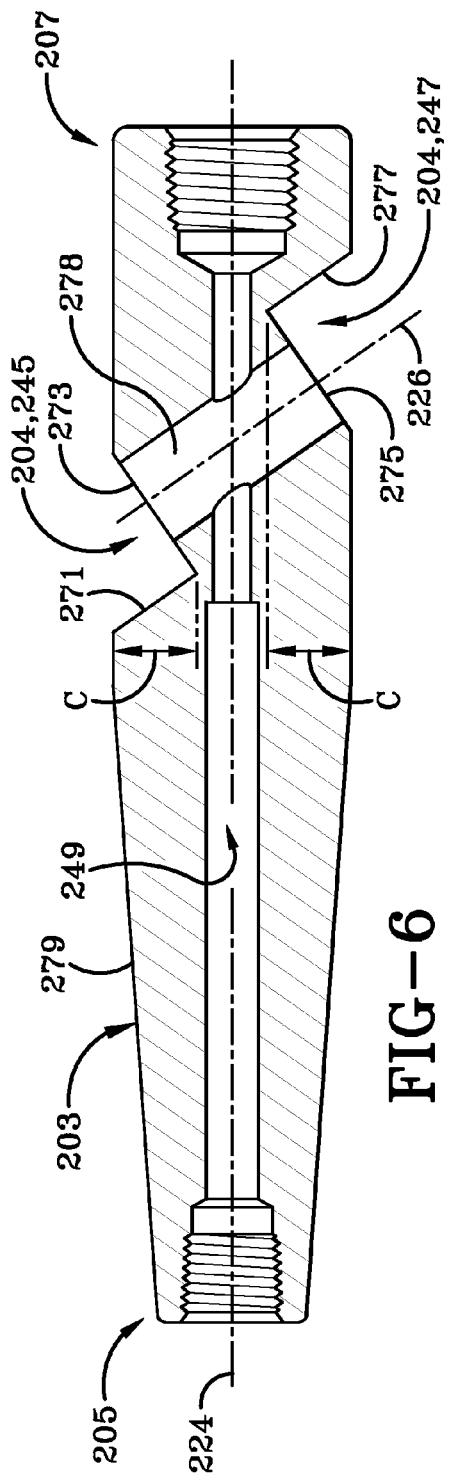
FIG. 6 is a cross-sectional view of a third embodiment of the pipe body of the present invention.

As shown in FIGS. 5 and 6, one of the primary features of the invention, in addition to the above discussed features, includes the orientation of the recessed area of pipe body 3. As shown in FIG. 5, a second embodiment of auxiliary oil gauge assembly 1 is shown having a pipe body 103. Pipe body 103 includes a recessed area 104 comprising a first recess 145 and a second recess 147. While first recess 145 and second recess 147 is generally similar to first recess 45 and second recess 47 respectively, one will readily observe in FIG. 5 that first recess 145 and second recess 147 is non-orthogonal with respect to interior channel 149. An imaginary central axis 124 is shown extending along the longitudinal center of pipe body 103 and an imaginary central axis 126 is shown extending along the longitudinal center of internal channel 178 where banjo bolt 15 is disposed in the assembled state. Similar to the first embodiment, the second embodiment of auxiliary oil gauge assembly 1 shown in FIG. 5 includes axis 126 whereby both pipe body 103 and banjo bolt 15 are independently rotatable about therewith. As discussed previously, this allows a user to independently tighten pipe body 103 to engine 4 while also independently adjusting gauge 9 for proper orientation.

The offset nature of first recess 145 and second recess 147 with respect to interior channel 149 allows auxiliary oil gauge assembly 1 to fit tightly against engine 4 and remain out of the way of the user's leg. As shown in FIG. 5, first recess 145 includes a wall 171 having a length A and a wall 173 having a length B. In the embodiment of auxiliary oil gauge assembly 1 shown in FIG. 2, the overall lengths of first recess area 45 and second recess area 47 are generally identical, while the embodiment shown in FIG. 5 portrays length A and length B as being not identical. Similarly, with respect to second recess 147, a wall 175 is disposed having length B and opposed to a wall 177 having length A. The overall orthogonal nature of first recess 45 and second recess 47 of FIG. 2, has been angled into a non-orthogonal manner for firm abutment with engine 4. An internal channel 178 of pipe body 103 is similarly angled to properly mate banjo bolt 15 with engine 4. The offset angles of first recess area 145 and second recess area 147 orient the overall auxiliary oil gauge assembly 1 shown in FIG. 5 upwardly towards the user of motorcycle 2 and for easy access and observation.

As shown in FIG. 6, a recessed area 204 of a pipe body 203 is shown and includes a first recess 245 and second recess 247. First recess 245 includes a wall 271 extending to meet a wall 273. Similar to recess 145, recess 245 includes an overall length, shown as length C. However, the embodiment of FIG. 6 includes wall 271 extending directly to wall 273 to form recess 245, whereas an intermediate surface is disposed between wall 171 and wall 173 in the embodiment shown in FIG. 5. Thus, first recess 245 of the embodiment shown in FIG. 6 is tailored to orient pipe body 203 to abut firmly against an engine having a different configuration with respect to the engine envisioned for the embodiment shown in FIG. 5. Similar to first recess 245, second recess 247 includes a wall 275 extending to a wall 277. First recess 245 and second recess 247 are aligned to form a linear fastener channel 278, similar to fastener channel 14 shown in FIG. 2. Fastener channel 278 is configured to receive banjo bolt 15 in a similar manner as described with respect to the embodiment shown in FIG. 2.

An imaginary central axis 224 is shown extending along the longitudinal center of pipe body 203 and an imaginary central axis 226 is shown extending along the longitudinal center of internal channel 278 where banjo bolt 15 is disposed in the assembled state. Similar to the first embodiment, the third embodiment of auxiliary oil gauge assembly 1 shown in FIG. 6 includes axis 226 whereby both pipe body 203 and banjo bolt 15 are independently rotatable about therewith. As discussed previously, this allows a user to independently tighten pipe body 203 to engine 4 while also independently adjusting gauge 9 for proper orientation.

As shown in FIG. 6, a surface 279 is shown which is generally tapered along the length of pipe body 203. This is in contrast with the embodiment shown in FIG. 2, where the overall outer surface and length of pipe body 3 is generally flat and non-tapered. Thus, it is a primary feature of the present invention that the overall outer body shape and profile may be configured for maximum benefit with respect to the overall fit against engine 4 and placement about motorcycle 2.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An auxiliary oil gauge assembly comprising:
a rigid pipe body abutting a motorcycle engine adapted to receive engine oil therethrough;
a mechanical oil gauge connected to the pipe body displaying the oil pressure of the motorcycle engine adjacent the motorcycle engine; and
an electrical sending unit connected the pipe body operatively coupled to an indicator light on the motorcycle;
wherein when rigid pipe body is abuttingly secured to the motorcycle engine, the auxiliary oil gauge assembly includes two indicator modes for indicating oil pressure in the engine, a first mode displaying pressure in the mechanical oil gauge and a second mode sensed by the electrical sending unit operatively coupled to the indicator light.

2. The auxiliary oil gauge assembly of claim 1, further comprising:
a fastener channel defined by the pipe body;
a threaded fastener assembly, whereby the fastener assembly extends through the fastener channel to rotatably secure the pipe body to the motorcycle engine; and
wherein threads on the threaded fastener assembly are sized similar to threads on the electrical sending unit;
whereby the fastener assembly rotates independently of the pipe body.

3. The auxiliary oil gauge assembly of claim 2, the fastener assembly comprising:
a banjo bolt, whereby the banjo bolt includes a shaft at least partially disposed in the fastener channel, the banjo bolt defining a longitudinal first channel and a latitudinal second channel intersecting the first channel at a union;
a pipe plug defining a longitudinal third channel sized to receive a portion of the shaft therein; and
wherein the first, second, and third channels are in fluid communication;
whereby the banjo bolt and pipe plug rotatably secure the pipe body to the motorcycle engine.

4. The auxiliary oil gauge assembly of claim 2, further comprising:
an interior channel formed within the rigid pipe body extending along the length of the rigid pipe body;
a banjo bolt including a shaft defining therein a longitudinal channel; and
wherein the longitudinal channel of the banjo bolt is in fluid communication and non-linearly aligned with the interior channel formed within the rigid pipe body.

5. The auxiliary oil gauge assembly of claim 4, further comprising a nut end on the banjo bolt disposed in a recessed area defined by the pipe body.

6. The auxiliary oil gauge assembly of claim 2, further including:
a recessed area defined by the rigid pipe body, whereby the fastener channel extends through the recessed area; and
a banjo bolt having a nut end and a shaft therein defining a longitudinal first channel and a latitudinal second channel intersecting the first channel at a union, whereby the nut end is disposed in the recessed area and the shaft is disposed at least partially in the fastener channel when the pipe body is abuttingly secured to the motorcycle engine.

7. An auxiliary oil gauge assembly comprising:
a pipe body defining a fastener channel extending diametrically through the pipe body and an interior channel extending along the length of the pipe body intersecting the fastener channel;
an oil gauge connected to the pipe body at least partially disposed in the interior channel;
a pipe plug defining a longitudinal channel therethrough at least partially disposed in the fastener channel;
a banjo bolt extending into the fastener channel and longitudinal channel;
whereby the pipe plug secures the pipe body to a motorcycle engine in a position where an operator leg cannot disturb the oil gauge; and
whereby the pipe plug rotates independently of the pipe body.

8. The auxiliary oil gauge assembly of claim 7, further comprising a recessed area defined by the pipe body, whereby one of a washer and the pipe plug abuts the recessed area.

9. The auxiliary oil gauge assembly of claim 7 further comprising an electrical sending unit mounted to one end of the rigid pipe body operatively connected to an existing indicator light on the motorcycle.

10. The auxiliary oil gauge assembly of claim 7, further comprising:
an imaginary longitudinal central axis extending through a center of the banjo bolt, the longitudinal first channel centered about the central axis; and
whereby the pipe body and pipe plug are independently rotatable about the imaginary axis.

11. The auxiliary oil gauge assembly of claim 10, further comprising an imaginary longitudinal central axis extending through the pipe body, and whereby the axis of the banjo bolt is non-orthogonal with the axis of the pipe body.

12. The auxiliary oil gauge assembly of claim 11, whereby the axis of the banjo bolt is non-coaxial with the axis of the pipe body.

13. The auxiliary oil gauge assembly of claim 7, further comprising a directly abutting mounting of the pipe body to the engine.

14. A method of monitoring oil pressure of a motorcycle in a mechanical gauge and an electrical sensor comprising the steps of:
disconnecting an electrical oil pressure sending unit from a motorcycle engine;
securing a rigid pipe body to the motorcycle engine via a fastener assembly;
connecting the electrical oil pressure sending unit to the pipe body to create a first indicator mode for identifying oil pressure information of the engine;
securing a mechanical oil gauge to the pipe body to create a second indicator mode for sensing oil pressure information of the engine;
adjusting the orientation of the mechanical oil gauge position by rotating the pipe body independently of the fastener assembly to ensure an operator leg cannot disturb the mechanical oil gauge.

15. The method of claim 14, further comprising the step of receiving oil into the pipe body from the motorcycle engine, wherein the rigid pipe body abuts the engine.

16. The method of claim 15, further comprising the step of connecting the pipe body to the motorcycle via the fastener assembly extending diametrically, at least partially through the pipe body.

17. The method of claim 16, further comprising the steps of:
- extending a banjo bolt through the pipe plug, the banjo bolt defining a longitudinal first channel and a latitudinal second channel intersecting the first channel at a union;
- securing a pipe plug on an end of the banjo bolt;
- receiving oil into the pipe body via the pipe plug and the banjo bolt.

18. The method of claim 17, further comprising the steps of:
- displaying oil pressure feedback on the oil gauge; and
- providing oil pressure feedback to the oil pressure sending unit.

19. The method of claim 14, further comprising the step of securing the pipe body to the motorcycle engine while maintaining an abutting orientation of the pipe body with respect to the motorcycle engine.

20. The method of claim 14, further comprising the step of reducing the thickness of the pipe body proximate an end of the pipe body.

* * * * *